United States Patent

Kolbert

[19]

[11] Patent Number: 4,932,057
[45] Date of Patent: Jun. 5, 1990

[54] PARALLEL TRANSMISSION TO MASK DATA RADIATION

[75] Inventor: Melvin Kolbert, Boca Raton, Fla.

[73] Assignee: Grumman Aerospace Corporation, Bethpage, N.Y.

[21] Appl. No.: 258,964

[22] Filed: Oct. 17, 1988

[51] Int. Cl.⁵ ............................................. H04K 1/10
[52] U.S. Cl. ...................................... 380/33; 380/6; 380/9; 380/50; 380/52
[58] Field of Search ...................... 380/3–6, 380/9, 37, 49, 50, 52, 59, 33

[56] References Cited

U.S. PATENT DOCUMENTS

| | | | |
|---|---|---|---|
| 2,178,089 | 10/1939 | Walker | 380/9 X |
| 2,463,502 | 3/1949 | Atkins | 380/6 |
| 3,100,890 | 8/1963 | Henning | 375/67 |
| 3,798,359 | 3/1974 | Feistel | 380/37 |
| 4,098,370 | 7/1978 | McGregor et al. | 380/6 X |
| 4,102,521 | 7/1978 | Hermann | 244/3.11 |
| 4,117,271 | 9/1978 | Teeter et al. | 380/52 |
| 4,255,811 | 3/1981 | Adler | 380/37 |
| 4,293,953 | 10/1981 | Gutleber | 375/25 |
| 4,392,241 | 7/1983 | Hurst | 380/33 |
| 4,493,028 | 1/1985 | Heath | 364/200 |

FOREIGN PATENT DOCUMENTS

| | | |
|---|---|---|
| 0036605 | 9/1981 | European Pat. Off. . |
| 1204087 | 9/1970 | United Kingdom . |
| 1211186 | 11/1970 | United Kingdom . |

Primary Examiner—Stephen C. Buczinski
Assistant Examiner—Bernarr Earl Gregory
Attorney, Agent, or Firm—Pollock, VandeSande & Priddy

[57] ABSTRACT

Aircraft often include a central memory which distributes data to a number of communication, navigational and other utilization devices. In order to achieve a high degree of security for data transmission from the memory to the utilization devices, data subsets are distributed to the utilization devices in parallel so that any radiation generated from the parallel branches results in superposition of individual data signals. In effect, a jumbled resultant signal is produced which is difficult or near impossible for unfriendly surveillance equipment to decipher.

4 Claims, 4 Drawing Sheets

PARALLEL TRANSMISSION TO MASK DATA RADIATION

FIELD OF THE INVENTION

The present invention relates to data distribution, and more particularly to a distribution system for securely distributing data within an aircraft between an external source and an aircraft data system.

BACKGROUND OF THE INVENTION

In the daily preparation of military aircraft, it is often necessary to store regularly updated security codes, known as crypto-variables or keys into weapon control and other communication systems such as friend or foe identification systems (IFF). This task is currently performed by a portable code storage box which is connected to an aircraft code memory device by means of conventional pin connectors. In the naval fleet this transfer of security codes to an aircraft is done during pre-dawn hours in all types of weather and sea conditions. On an aircraft carrier, this is manually performed by a cryptocustodian to aircraft that rests on the flight and hanger decks.

Although the procedure is generally satisfactory, it is a time-consuming one requiring proper connector hook-up between aircraft and the custodian's portable security code box. Due to the harsh environment, connectors often deteriorate and the reliability of the connectors is limited. Typically, such connectors are called upon to transfer digital security codes to an internal code memory of the aircraft. When the connectors between the portable code box and the aircraft evidence physical or electrical deterioration, errors in code transfer are possible.

In my co-pending patent application Ser. No. 224,605, a coupling device was disclosed which preferably magnetically transfers data and circuit power to an aircraft security code storage circuit without the inclusion of mechanical pin connectors. In the environment of an aircraft, the conventional custodian's security code portable transfer box is equipped with a sending unit which is magnetically attached to the exterior of an aircraft skin At an aligned position along the interior surface of the skin is a receiving pick-up unit which magnetically picks up the digital code and low voltage power being transferred by the sending unit. The sending unit is easily removed after signal and power transfer have taken place by simply detaching it from the aircraft. As will be appreciated, such a simple and elegant technique avoids the problems of pin-type connectors which have been employed heretofore.

In actual utilization of the coupler described, it is impossible to completely eliminate electromagnetic radiation which might be detected by a nearby intruder, such as an enemy submarine. Accordingly, it would be highly desirable if the coupled data could be encrypted in a manner that would avoid useful decoding of the coupled data.

In my co-pending patent application Ser. No. 258,349, a random number generator, located within an aircraft, generates a random number which is coupled to the sending unit of the coupler, and from there to a data generator. This random number serves to encode the data which is ultimately transmitted, as encrypted data, to the pick-up unit, via the sending unit. Once the encrypted data is received by circuitry within the aircraft, it is decoded in the same sequence as it was encoded during encryption.

Accordingly, if the random number alone or the encoded encrypted data is detected by enemy surveillance equipment, the true data itself cannot be decoded since the decoding sequence is only properly performed by compatible encoding and decoding equipment of the present invention.

Thus far, my co-pending applications have been described in terms of providing secure data. However, it is possible for unfriendly parties to employ available sensitive detection devices to detect radiated data signals emanating from internal aircraft cables connecting the data memory to the various data utilization devices within the aircraft Accordingly, it is highly desirable to effect a method for masking the internal data signals in such a manner that would prevent useful radiation detection.

BRIEF DESCRIPTION OF THE PRESENT INVENTION

Modern fighter aircraft have the data provided in various subsets for a plurality of utilization devices on board the aircraft In prior art systems, the various subsets are serially read into the various utilization devices from a data storage memory. The primary concept of the present invention is to provide the utilization devices with data subsets which are loaded in parallel so that any radiated data of each subset is masked by the other radiated superimposed subsets. More particularly, the masking occurs because each of the parallel subset paths generates a radiated signal which becomes superimposed with the other subset data which produces a resultant scrambled signal which is extremely difficult to process for retrieval of the individual data subsets.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 5:
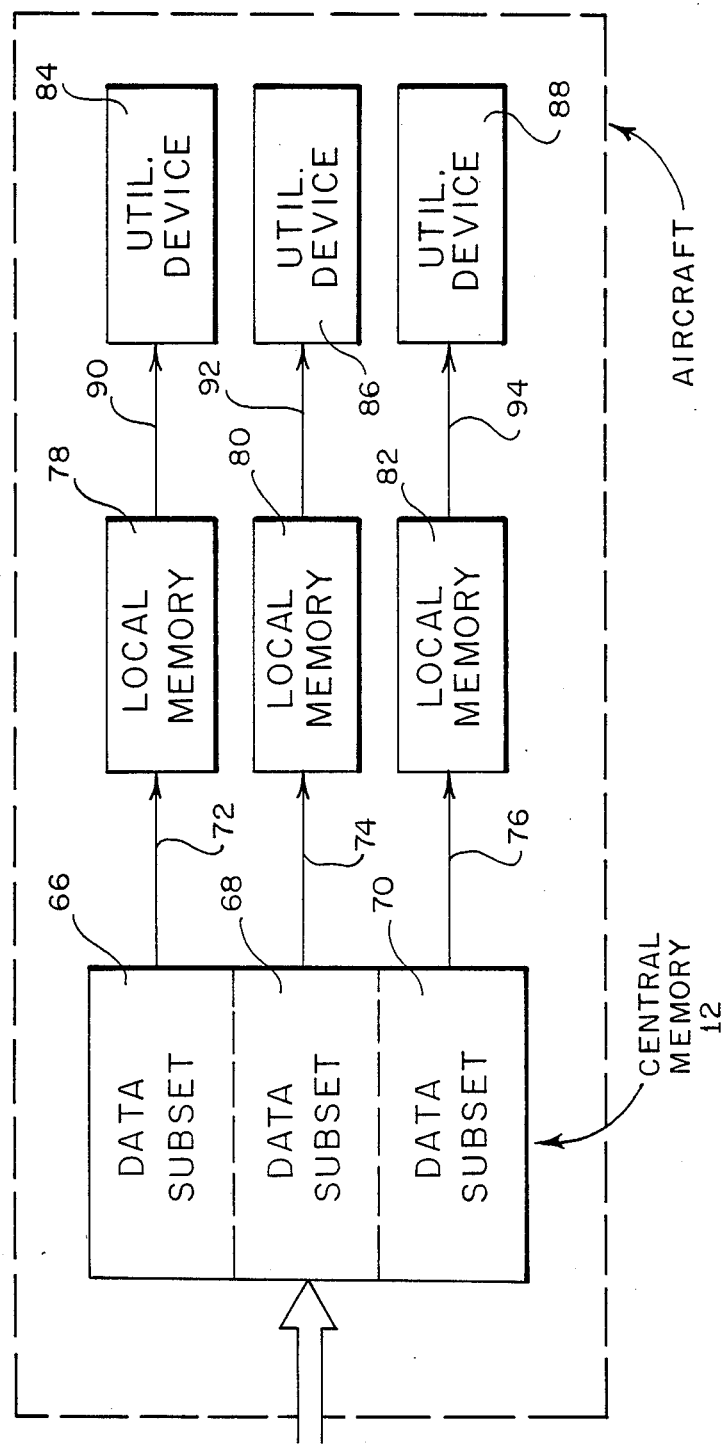
FIG. 5 is a block diagram of the parallel data distribution system in accordance with the present invention.

Prior to a discussion of the present parallel data distribution as depicted in FIG. 5, a detailed description of the signal coupling system of my, mentioned co-pending patent application Ser. No. 258,349 will be discussed.

Figure 1:
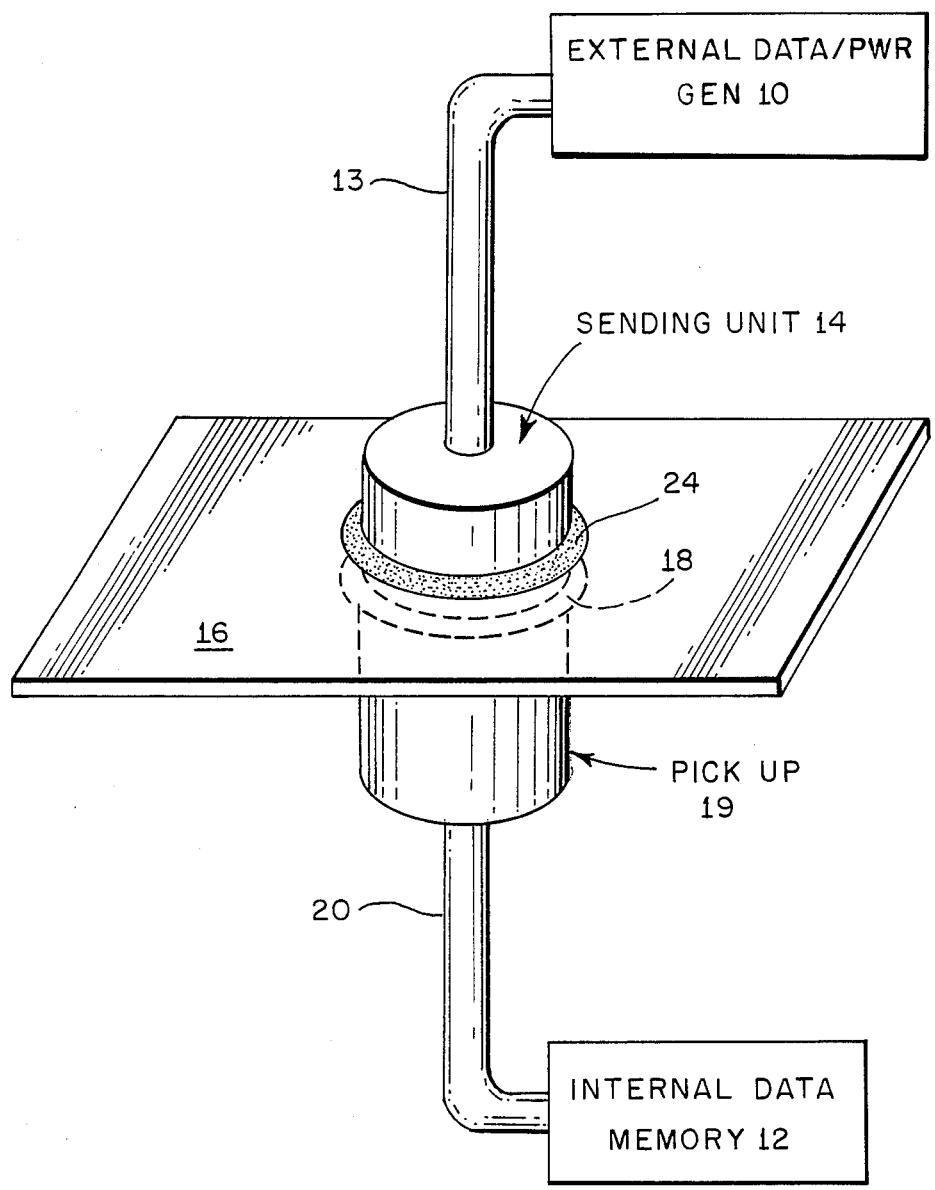
FIG. 1 is a diagrammatic illustration of the installation of a data coupler on an aircraft skin.

FIG. 1 is a diagrammatic view showing the coupler of my co-pending application, shown installed on an aircraft skin. The portable code box discussed in the Background of the Invention is indicated as an external data/power generator 10 in FIG. 1. Such an external storing generator has long been used in the prior art. In addition to being able to read out stored data, the generator 10 is supplied with a switch (Power Inverter) that initially powers an internal aircraft memory circuit when the aircraft's own power is off, thereby enabling a memory to start its data storage operation and send confirmation control signals back to the generator 10. This is a great advantage as loading can take place at any time prior to launch even without aircraft power or ground power on.

Figure 2:
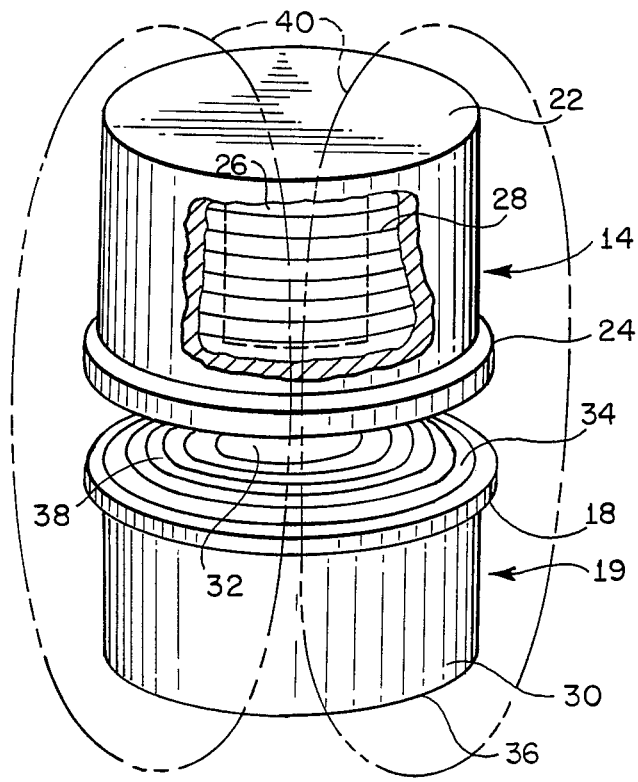
FIG. 2 is a cut-away diagrammatic view of a magnetic induction sending and pick-up pair, constituting a coupler, for which the present invention is intended.

The coupling of power and data from the generator 10 includes a cable 13 connected at a first end to generator 10 and at an opposite end to a sending unit 14. For example, such a unit may be an inductive primary unit as shown in FIG. 2 and discussed hereinafter.

The sending unit 14 is equipped with a circular magnetic ring 24, which may be of the gasket type used in home refrigerators. A mating magnetic ring 18 is appropriately cemented to the internal surface of an aircraft skin 16. The sending unit 14 is detachable from the aircraft skin by simply exerting sufficient tension. Of course, other types of temporary attachment may be employed such as suction, velcro, etc.

A complementary inductive pick-up unit 19 may be permanently cemented to the interior surface of the aircraft skin 16 or it may be temporarily mounted by utilizing ring magnets or the like, as just discussed in connection with the sending unit 14. Signals sent from generator 10 through the sending unit 14 are inductively picked-up by the pick-up unit 19 and transferred to an internal data memory 12 by means of a cable 20.

In operation of the device illustrated in FIG. 1, power may be supplied from the external data/power generator 10 to the internal data memory 12 in order to power the memory circuits if the aircraft power supply is turned off. The data memory circuits 12 are of the type that already exist aboard military aircraft After the memory circuits have been sufficiently energized, the generator 10 may be switched to a data transmission mode so that the sending unit and pick-up units 14 and 19, respectively, may couple the data to the data memory 12.

The particular structure of the inductive coupling units 14 and 19 are illustrated in greater detail in FIG. 2. However, it is to be emphasized that other types of sending and pick-up units, other than the particular inductive units illustrated in FIG. 2, may be employed. For example, other types of magnetic, capacitive, sonic or vibratory transducers are technically feasible The particular magnetic inductance units shown in FIG. 2 include a sending unit 14 having a ferromagnetic housing 22 with a ring magnet, preferably a rubber gasket type ring magnet 24 cemented around the bottom periphery thereof. The magnet is for detachable connection to the aircraft skin by means of the magnets internally cemented thereto, as previously mentioned A cylindrical ferromagnetic coil form is axially disposed within the housing 22 and serves as a core for windings 28 also located within the housing The winding 28 serves as a primary winding and cooperates with a secondary winding, located within the pick-up unit 19, as will be discussed hereinafter. An electromagnetic field is created between the primary winding 28, core 26 and the housing 22.

The pick-up unit 19 includes a similar structure, namely, a central ferromagnetic core 32 with a secondary winding 38 secured thereto and a ferromagnetic housing 30 which may be opened on the illustrated top end 34 to allow the sending structure to be cemented, at this end, to the interior surface of an aircraft skin. Alternately, this end may be enclosed and detachably mounted to the interior surface of an aircraft skin by means of ring magnets, as discussed in connection with FIG. 1. The opposite end 36 of the pick-up unit 19 is closed. An electromagnetic field is created between the cores 26 and 32 via housings 22 and 30. When the sending and pick-up units are positioned on opposite sides of an aircraft skin, the two units are inductively coupled and magnetic flux lines link the two, as indicated by reference numeral 40.

Figure 3:
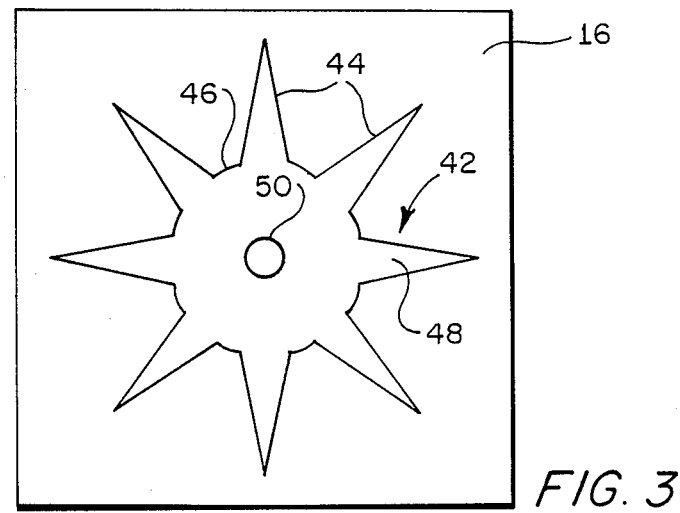
FIG. 3 is a diagrammatic elevational view of a section of an aircraft skin to which a sending unit, such as shown in FIG. 2, is attached.

In order to minimize power dissipation of the coupled signal and power, it would be preferable to have the area of the aircraft skin between the sending and pick-up units fabricated from a non-conducting material This is a preferable design consideration when high frequencies are employed or otherwise, unwanted eddy currents may develop. In order to maximize the structural connection of a non-conductive area to a conductive aircraft skin, a slotted configuration as shown in FIG. 3 may be employed. In this figure, an area of the aircraft skin 16 has a star-shaped slot 42 cut therein. The void created is filled with a non-conductive material, such as fiberglass, so as to completely fill the slot as indicated by reference numeral 48. The slot itself is characterized by pointed projections 44 interconnected around a circular boundary 46. The utilization of the pointed projections increases the electrical and electromagnetic resistance of the aircraft skin in the vicinity of installation for sending and pick-up units which results in a decrease of power dissipation between the sending and pick-up units. In addition, the projections serve to mechanically interlock the non-conductive material 48 to the aircraft skin 16, this being an important consideration in the harsh environment encountered along the outer skin of a military high-speed aircraft.

The center of the filled-in slot may have a central spot 50 painted thereon so as to guide the center placement of the sending unit 14 when data and power are to be inductively coupled.

Although a simplified inductive coupling is illustrated in connection with the sending and pick-up units, it is also possible to use multiple coils to separate the coupled signal and power so that two distinctive coupling paths are created.

Figure 4:
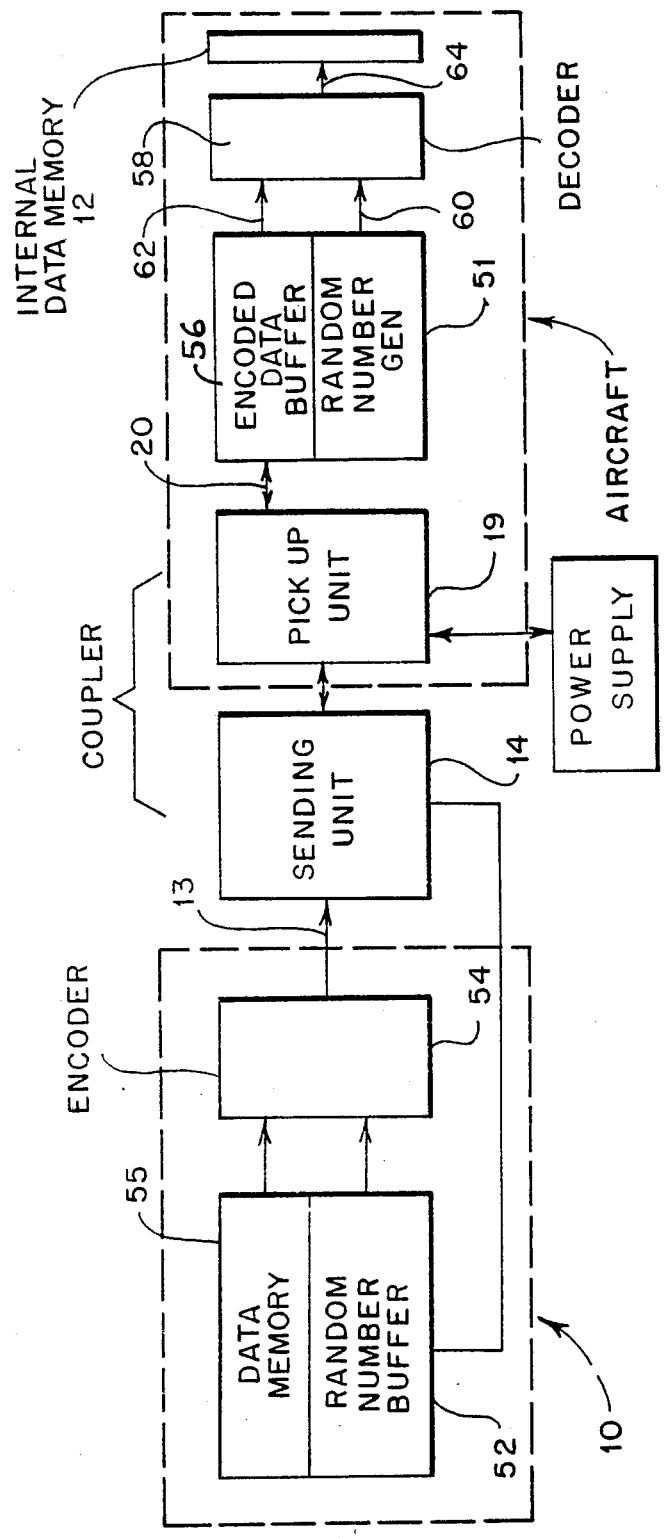
FIG. 4 is a block diagram of the random number system of my co-pending application.

Security of the described system is increased by the random number system of my co-pending patent application Ser. No. 258,349. In operation of that system as illustrated in FIG. 4, the operational sequence generally begins after power is coupled to the internal data memory 12 as previously discussed. Afterwards, the data generator 10 couples a start command to the control circuits of memory 12 in a conventional manner. A random number generator 51 located within the aircraft generates a random number and outputs it to the pick-up unit 19. Since the pick-up unit and sending unit are symmetrical and inductively coupled devices, the pick-up unit acts as a primary at this time, while the sending unit 14 acts as a secondary. The random number becomes stored in buffer 52 which is located in the data generator 10. The data stored in memory 55 and the random number are encoded in an encoder 54 in accordance with a specific sequence. The encoded data now represents an encryption of the basic data by the random number. Wire 13 connects the output of encoder 54 to the sending unit 14 so that the encoded data may be coupled to the pick-up unit 19. The latter unit then outputs the encoded data to buffer 56 within the aircraft. A decoder 58 has its inputs 60, 62 respectively connected to the random number generator and the encoded data buffer so that the encrypted data may be decoded in accordance with the same specific sequence governing the encoder 54. The output 64 of the decoder then delivers the decoded data to the internal data memory 12 for use by other data or communication equipment on board the aircraft in a conventional fashion. To further increase the security of communication, it is intended that each aircraft generate a different random number when the data generator 10 is coupled to succeeding aircraft.

The present invention is a further improvement of the systems disclosed in my co-pending applications and provides parallel distribution of data subsets to a plurality of utilization devices so that any radiated data signals will be superimposed to produce a resultant jumbled signal which effectively masks the data of each subset.

In order to better appreciate the concept of the present invention, reference is made to FIG. 5. As will be seen from the figure, the memory 12 stores a plurality of data subsets in locations 66, 68 and 70, by way of example. In a preferred embodiment of the present invention, memory 12 is a non-volatile RAM. The data subsets have been provided from the originating data source, via the sending and pick-up units. Connecting cables 72, 74 and 76 are connected from respective subset output ports of memory 12 to corresponding input ports of local memories 78, 80 and 82. Each of the latter-mentioned local memories serves to store one of the data subsets for a corresponding utilization device. The indicated utilization devices 84, 86 and 88 are respectively connected to their local memories by the parallel connecting cables 90, 92 and 94; and data will flow therebetween as the utilization devices require. With the simultaneous parallel flow of data along cables 72, 74 and 76, any resulting radiation outside the aircraft will be detected, by unfriendly surveillance, as superimposed unintelligible signals representing the parallel distributed data subsets. In addition, the noise present along the various parallel data channels is superimposed to increase the unintelligibility of the detected signal. Shielded cables 72, 74 and 76 are typically long "spider" cables which have a tendency to radiate signals; and the present invention is directed to obviate this problem.

Further enhancements for increasing the security of the system are to load the local memories with the various data subsets at different frequencies and signal amplitudes. Also, it is possible to encrypt the data as it is distributed from the memory 12 to the local memories.

As will be appreciated from an understanding of the present invention, there is offered a parallel data distribution system which creates electromagnetic radiation characterized as a superposition of the radiation for corresponding data subsets. A resultant scrambled signal is difficult, if not impossible to decipher by unfriendly surveillance equipment. Accordingly, the present invention enhances the security of data distribution within a military aircraft.

It should be understood that the invention is not limited to the exact details of construction shown and described herein for obvious modifications will occur to persons skilled in the art.

I claim:

1. A method for securing aircraft data distribution from electromagnetic radiation detection, the method comprising the steps:

coupling data from a data source outside the aircraft to a central non-volatile memory for storage of data subsets;

loading a plurality of remote local memories from the central memory in parallel with corresponding data subsets, whereby any electromagnetic radiation from data loading results in a scrambled superimposed radiation signal from all the subsets from which the individual data subsets cannot be detected; and individually parallel loading the data subsets from the local memories to corresponding utilization devices.

2. The method set forth in claim 1 wherein the central memory is a non-volatile RAM.

3. A data security distribution system comprising:

pick-up means for receiving data coupled to the aircraft from a data source located externally of the aircraft;

a central memory having its input ports connected to the output of the pick-up means for storing a plurality of coupled data subsets;

a plurality of local memories connected in parallel to output ports of the central memory for loading the data subsets into corresponding local memories;

whereby any electromagnetic radiation from data loading results in a scrambled superimposed radiation signal from all of the subsets from which the individual data subsets cannot be detected; and a plurality of means for individually connecting the data subsets in parallel to respective utilization devices.

4. The structure set forth in claim 3 wherein the central memory is a non-volatile RAM.

* * * * *

UNITED STATES PATENT AND TRADEMARK OFFICE
CERTIFICATE OF CORRECTION

PATENT NO.   : 4,932,057
DATED        : June 5, 1990
INVENTOR(S)  : Melvin Kolbert It is certified that error appears in the above-identified patent and that said Letters Patent is hereby corrected as shown below:

Column 2, line 15, after "aircraft" insert --,--.

Column 2, line 24, after "aircraft" insert --,--.

Column 2, line 60, after "my" delete ",".

Column 3, line 35, after "aircraft" insert --,--.

Column 3, line 47, after "feasible" insert --,--.

Column 3, line 54, after "mentioned" insert --,--

Column 3, line 57, after "housing" insert --,--.

Column 4, line 14, after "material" insert --,--.

Signed and Sealed this

Eighteenth Day of June, 1991

Attest:

*Attesting Officer*

HARRY F. MANBECK, JR.

*Commissioner of Patents and Trademarks*